United States Patent
Han et al.

(10) Patent No.: US 10,193,475 B2
(45) Date of Patent: Jan. 29, 2019

(54) SENSORLESS CONTROL OF SWITCHED RELUCTANCE MACHINES FOR LOW SPEEDS AND STANDSTILL

(71) Applicant: Caterpillar Inc., Peoria, IL (US)

(72) Inventors: Seok-hee Han, Dunlap, IL (US); Carlos Nino Baron, Edwards, IL (US); Jackson Wai, Dunlap, IL (US); Ahmed Khalil, Peoria, IL (US); Ernesto Inoa, Dunlap, IL (US); Jesse Gerdes, Dunlap, IL (US); James Michael Thorne, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 16 days.

(21) Appl. No.: 15/317,487

(22) PCT Filed: May 18, 2015

(86) PCT No.: PCT/US2015/031332
§ 371 (c)(1),
(2) Date: Dec. 9, 2016

(87) PCT Pub. No.: WO2015/199841
PCT Pub. Date: Dec. 30, 2015

(65) Prior Publication Data
US 2017/0126156 A1    May 4, 2017

Related U.S. Application Data

(63) Continuation of application No. 14/314,510, filed on Jun. 25, 2014.

(51) Int. Cl.
| | |
|---|---|
| *H02P 25/08* | (2016.01) |
| *H02P 6/18* | (2016.01) |
| *H02P 6/185* | (2016.01) |
| *H02P 25/089* | (2016.01) |
| *H02P 27/06* | (2006.01) |

(52) U.S. Cl.
CPC .............. *H02P 6/185* (2013.01); *H02P 25/08* (2013.01); *H02P 25/089* (2016.02); *H02P 27/06* (2013.01); *H02P 6/18* (2013.01)

(58) Field of Classification Search
None
See application file for complete search history.

(56) References Cited

U.S. PATENT DOCUMENTS

| | | |
|---|---|---|
| 4,707,650 A | 11/1987 | Bose |
| 4,772,839 A | 9/1988 | MacMinn et al. |

(Continued)

FOREIGN PATENT DOCUMENTS

| | | |
|---|---|---|
| EP | 1553691 A1 | 7/2005 |
| EP | 2712075 A1 | 9/2012 |

(Continued)

OTHER PUBLICATIONS

International Search Report for related International Application No. PCT/US2015/031332; report dated Jul. 29, 2015.

(Continued)

*Primary Examiner* — Bentsu Ro
*Assistant Examiner* — Zemenay Truneh
(74) *Attorney, Agent, or Firm* — Miller, Matthias & Hull

(57) ABSTRACT

A method for determining rotor position of a switched reluctance (SR) machine having a rotor and a stator is provided. The method may include injecting a test pulse into one or more idle phases of the SR machine, determining a decoupled flux value based at least partially on a total flux value corresponding to the test pulse and a mutual flux value, and determining the rotor position based at least partially on the decoupled flux value.

10 Claims, 3 Drawing Sheets

(56) References Cited

U.S. PATENT DOCUMENTS

| | | | |
|---|---|---|---|
| 5,097,190 A | 3/1992 | Lyons et al. | |
| 5,107,195 A | 4/1992 | Lyons et al. | |
| 5,256,923 A | 10/1993 | Bartos et al. | |
| 5,525,886 A | 6/1996 | Lyons et al. | |
| 5,646,491 A | 7/1997 | Erdman et al. | |
| 5,864,217 A | 1/1999 | Lyons et al. | |
| 6,291,949 B1 | 9/2001 | Green | |
| 6,989,668 B2* | 1/2006 | Mayes | H02P 6/18 318/254.1 |
| 7,271,556 B2 | 9/2007 | Kishibe et al. | |
| 8,610,389 B2 | 12/2013 | Lee et al. | |
| 2001/0026139 A1* | 10/2001 | Mayes | H02P 6/185 318/701 |
| 2004/0108826 A1 | 6/2004 | Green | |
| 2004/0124806 A1 | 7/2004 | Ehsani et al. | |
| 2004/0245983 A1 | 12/2004 | Mayes | |
| 2005/0067998 A1 | 3/2005 | Green | |
| 2011/0012544 A1 | 1/2011 | Schultz et al. | |
| 2014/0117901 A1 | 5/2014 | Gerdes et al. | |

FOREIGN PATENT DOCUMENTS

| | | |
|---|---|---|
| JP | 2005-2161138 A | 9/2005 |
| KR | 10-2005-0002151 A | 1/2005 |

OTHER PUBLICATIONS

Iqbal Husain; "Indirect rotor-position estimation techniques for switched reluctance motors—A review"; Power Electronic Laboratory; Department of Electrical Engineering, The University of Akron; pp. 1-15.

Kenneth R. Thompson; "Rotor Position Estimation in a Switched Reluctance Drive Using Recursive Least Squares"; Transactions on Industrial Electronics. vol. 47, No. 2; Apr. 2000; pp. 368-379.

Debiprasad Panda; "Sensorless Control of Switched Reluctance Motor Drive with Self-Measured Flux-Linkage Characteristics"; Deparatment of Electrical Engineering, Indian Institute of Science; 2000; pp. 1569-1574.

Gabriel Gallegos-Lopez; "High-grade Position Estimation for SRM Drives Using Flux Linkage/Current Correction Model"; Dept. of E&E Eng., UK; 1998; pp. 731-738.

\* cited by examiner

SENSORLESS CONTROL OF SWITCHED RELUCTANCE MACHINES FOR LOW SPEEDS AND STANDSTILL

CROSS-REFERENCE TO RELATED APPLICATION

This Application is a 35 USC § 371 US National Stage filing of International Application No. PCT/US2015/031332 filed on May 18, 2015 which claims priority under the Paris Convention to U.S. Ser. No. 14/314,510 filed on Jun. 25, 2014.

TECHNICAL FIELD

The present disclosure relates generally to switched reluctance machines, and more particularly, to sensorless systems and methods for controlling switched reluctance machines.

BACKGROUND

An electric machine such as an electrical motor, power generation system, genset, or the like, is generally used to convert one form of energy into another and may operate in a motoring mode to convert electrical input into rotational or otherwise mechanical output, or operate in a generating mode to convert rotational or otherwise mechanical input into electrical output. Among the various types of machines available for use with an electric drive, switched reluctance (SR) machines have received great interest for being robust and cost-effective. While currently existing systems and methods for controlling such electric machines provide adequate control, there is still room for improvement.

Among other factors, proper determination of the position of the rotor relative to the stator of the SR machine, while at rest or at an otherwise substantially low machine speed, is important to the performance and efficiency of the SR machine. Some conventional control schemes rely on a mechanically aligned speed wheel and sensors to detect and determine the position of the rotor relative to the stator at machine standstill or low speed operations. These control schemes typically require costly and complex implementations and are still susceptible to error. For instance, an error of 2 degrees in the detected mechanical rotor position of an SR machine, caused by a skewed sensor, a mechanical misalignment of the speed wheel, or the like, may correspond to a 0.5% decrease in efficiency of the electric drive assembly at full load.

Sensorless control schemes can also be used to derive the rotor position using electrical characteristics of the SR machine. For example, the control system of U.S. Pat. No. 5,525,886 to Lyons, et al. injects a current signal having fixed voltage frequency and varying current height to compute a total voltage flux in the SR machine. Lyons then determines the rotor position based on the voltage flux and the phase current. While Lyons may provide more simplicity over sensor-based schemes, the voltage integrator in Lyons still accumulates offset errors at least during the measurement path and in estimating the voltage flux. Such error accumulation can be compounded and adversely affects the accuracy of rotor position detection especially during low machine speeds and standstill.

Accordingly, there is a need to provide a control system or scheme for controlling SR machines that is less costly and easier to implement without compromising overall performance. Moreover, there is a need to provide a control system or scheme that does not rely on rotor position sensors, and further, substantially reduces accumulation of offset errors to provide for more accurate, more reliable and more efficient operation of an SR machine at standstill or low machine speeds. The systems and methods disclosed are directed at addressing one or more of these needs.

SUMMARY OF THE DISCLOSURE

In one aspect of the present disclosure, a method for determining rotor position of a switched reluctance (SR) machine having a rotor and a stator is provided. The method may include injecting a test pulse into one or more idle phases of the SR machine, determining a decoupled flux value based at least partially on a total flux value corresponding to the test pulse and a mutual flux value, and determining the rotor position based at least partially on the decoupled flux value.

In another aspect of the disclosure, a control system for an SR machine having a rotor and a stator is provided. The control system may include a converter circuit in electrical communication between the stator and a common bus, and a controller in electrical communication with at least the converter circuit. The controller may be configured to inject a test pulse into one or more idle phases of the SR machine, determine a decoupled flux value based at least partially on a total flux value corresponding to the test pulse and a mutual flux value, and determine the rotor position based at least partially on the decoupled flux value.

In yet another aspect of the disclosure, an electric drive is provided. The electric drive may include an SR machine having a stator and a rotor rotatably disposed relative to the stator, a converter circuit configured to electrically communicate with the stator and a common bus, and a controller in electrical communication with at least the converter circuit. The controller may be configured to inject a test pulse into one or more idle phases of the SR machine, determine a decoupled flux value based at least partially on a total flux value corresponding to the test pulse and a mutual flux value, and determine the rotor position based at least partially on the decoupled flux value.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
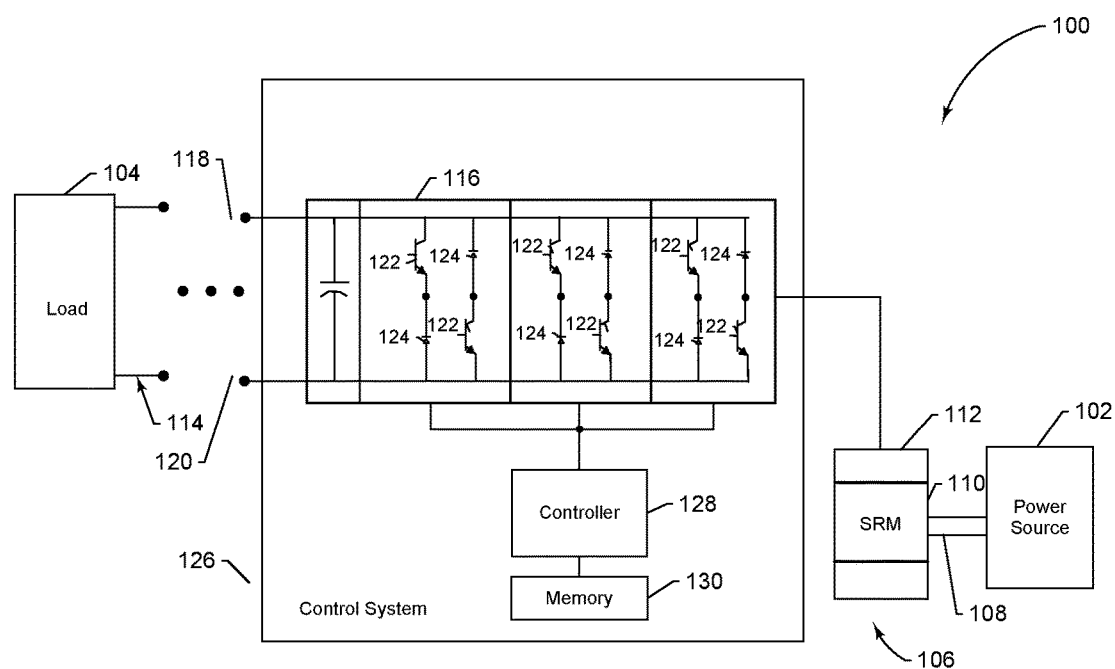
FIG. 1 is a schematic view of an exemplary embodiment of an electric drive with a control system for controlling a switched reluctance (SR) machine.

FIG. 1 schematically illustrates an exemplary electric drive 100 that may be employed to communicate power between a first drive component 102 and a second drive component 104. The first drive component 102 may include a primary power source, such as a diesel engine, a gasoline engine, a natural gas engine, or any other source of mechanical or rotational energy commonly used in association with mobile tools, industrial machines, and the like. The first drive component 102 may alternatively include a primary power source used in conjunction with stationary applications, such as windmills, hydro-electric dams, batteries, fuel cells, or any other suitable source of energy. The first drive component 102 may also include electrical loads, such as motors for driving wheels, tracks, or other traction devices which may be driven during motoring modes of operating the electric drive 100. The second drive component 104 may also include loads, or one or more devices or components which consume and/or employ electrical power provided thereto by the electric drive 100. For example, with respect to industrial work machines or mobile work vehicles, the second drive component 104 may include one or more motors for operating tools of the machine and/or one or more traction motors for causing motion of the vehicle.

Moreover, mechanical energy that is supplied by the first drive component 102 may be converted into electrical power by the electric drive 100 for use by the second drive component 104. Conversely, any electrical power that is supplied by the second drive component 104 and/or the electric drive 100 may be supplied to drive mechanical power to the first drive component 102. As shown in the particular embodiment of FIG. 1, for instance, the electric drive 100 may communicate with the first drive component 102 through a switched reluctance (SR) machine 106, or the like. As is well known in the art, the SR machine 106 may include a rotor 110 that is rotatably disposed within a fixed stator 112. The rotor 110 of the SR machine 106 may be rigidly and rotatably coupled to an output of the first drive component 102 via a coupling 108, or in other embodiments, via a direct crankshaft, a gear train, a hydraulic circuit, or the like. Each phase or phase winding of the stator 112 of the SR machine 106 may be electrically coupled to a common bus 114 of the electric drive 100 via a converter circuit 116.

During a generating mode of operation, as the rotor 110 of the SR machine 106 is rotated within the stator 112 by the first drive component 102, electrical current may be induced within the stator 112 and supplied to the converter circuit 116. The converter circuit 116 may in turn convert the electrical signals into the appropriate direct current (DC) voltage for distribution to the electrical load 104 and/or any other device via the common bus 114. The common bus 114 may provide terminals 118, such as positive and negative or ground lines, across which the common bus 114 may communicate a bus voltage or DC link voltage between one or more electrically parallel devices of the electric drive assembly 100. The load 104 may include circuitry for converting the DC voltage supplied by the converter circuit 116 into the appropriate electrical signals for operating any one or more devices associated with the electric drive 100. Additionally, during a motoring mode of operation, or when the electrical load 104 becomes the sink of electrical power, the SR machine 106 may be enabled to cause rotation of the rotor 110 in response to electrical signals that are provided to the stator 112 from the common bus 114.

As shown in FIG. 1, the converter circuit 116 may include a series of transistors or gated switches 120 and diodes 122 for selectively enabling one or more phase windings or phases of the SR machine 106. A three-phase SR machine 106, for example, may be driven using a converter circuit 116 with six switches 120 and six diodes 122 for selectively enabling or disabling each of the three phases of the SR machine 106. Each of the switches 120 may further be enabled or disabled via gate signals while an external or secondary power source 124 provides power across the positive and negative lines 118 of the common bus 114 to force current through the respectively enabled switches 120 and diodes 122.

Still referring to FIG. 1, the electric drive 100 may also be provided with an exemplary control system 126 configured to, among other things, determine the position of the rotor 110 of the SR machine 106 relative to the stator 112 and control operation of the SR machine 106 based on the determined rotor position. As illustrated in FIG. 1, the control system 126 may generally include the converter circuit 116, at least one controller 128 in communication with the gated switches 120 of the converter circuit 116, as well as a memory 130 in communication with the controller 128 that is provided within and/or external to the controller 128. More particularly, the controller 128 may be electrically coupled to the switches 120 in a manner which enables the controller 128 to selectively engage the switches 120 and source current through the different phases of the SR machine 106, as well as in a manner which enables the controller 128 to monitor electrical characteristics of the SR machine 106 and the bus or DC link voltage of the common bus 114 during operation of the SR machine 106. The memory 130 may retrievably store one or more algorithms, machine data, predefined relationships between different machine parameters, preprogrammed models, such as in the form of lookup tables and/or maps, or any other information that may be accessed by the controller 128 and relevant to the operation of the SR machine 106.

The controller 128 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically controlling functionality of the control system 126. The controller 128 may be configured to operate according to predetermined algorithms or sets of instructions for operating the electric drive 100 and the SR machine 106 based on the rotational speed and/or position of the rotor 110 relative to the stator 112 or other operating characteristics of the electric drive 100. Such algorithms or sets of instructions may be preprogrammed or incorporated into memory 130 that is associated with or at least accessible to the controller 128 as is commonly used in the art.

Figure 2:
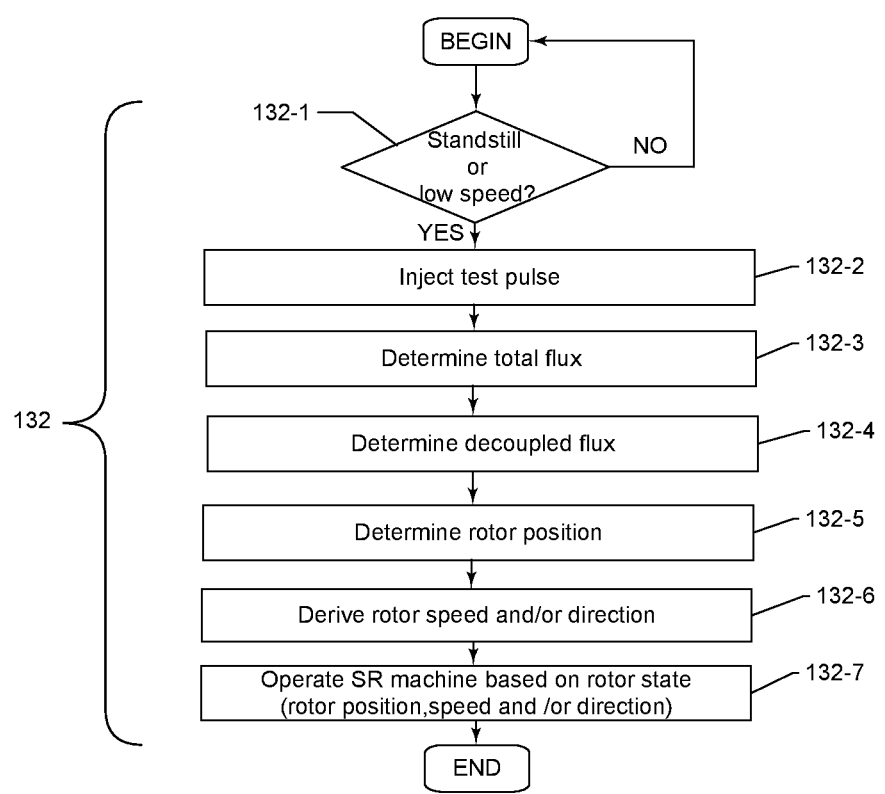
FIG. 2 is a flow diagram of an algorithm or method for determining the rotor position of an SR machine.

Turning now to FIG. 2, one exemplary algorithm or method 132 for controlling an SR machine 106 is provided. More specifically, the method 132 may be used to configure the controller 128 to at least assess or determine the position of a rotor 110 relative to the stator 112 of an SR machine 106, such as during machine standstill or low speed operations, and to operate the SR machine 106 according to the determined rotor position. Each iteration of the method 132 shown in FIG. 2 may be repeated per cycle, per phase, or any other predefined duration or count, and performed at least for as long as the SR machine 106 is in standstill or operating at substantially low speeds. In other embodiments, any one or more of the blocks or functions of the method 132 may also be performed during other operating modes or operating speeds of the SR machine 106. Furthermore, as it will be understood by those of ordinary skill in the relevant art, any one or more of the blocks or functions of the method 132 may be omitted, substituted, rearranged or otherwise modified for different applications while providing comparable results.

As shown, the controller 128 in block 132-1 may initially monitor the operating state of the SR machine 106 to detect when the machine speed is zero, approximately zero, or an otherwise relatively low speed, such as when compared to the rise time of phase current. The controller 128 may determine the operating state of the SR machine 106 by monitoring the rotational speed of the rotor 110 of the SR machine 106 relative to the stator 112, monitoring the operating state of the first drive component 102 and/or coupling 108, monitoring corresponding electrical properties of the common bus 114 and/or converter circuit 116, or the like. If the SR machine 106 is operating at relatively higher speeds where offset errors in machine measurements may be negligible, the controller 128 may continue monitoring for standstill or low speed operations where errors may be more prevalent. If the controller 128 in block 132-1 determines that the SR machine 106 is in standstill or operating at relatively low speeds, the controller 128 may be configured to proceed to block 132-2 to determine the position of the rotor 110 relative to the stator 112.

In accordance with block 132-2 of the method 132 of FIG. 2, the controller 128 may be configured to inject a diagnostic or test pulse into the relevant phases of the SR machine 106. In particular, the controller 128 may be configured to selectively enable corresponding switches 120 of the converter circuit 116 in a manner which drives a phase current through at least each idle phase of the stator 112, or only those phases that are not controlling the SR machine 106 at a given instance. The controller 128 may be configured to generate a test pulse with a substantially constant current height so as to facilitate further computations which may be performed later, such as computations associated with decoupling or compensating for flux due to mutual coupling, or the like. Furthermore, the controller 128 may be configured to generate and inject the test pulse into idle phases according to feedback pertaining to the last known or most recent assessment of the rotor position. Once the test pulse is injected, the controller 128 in block 132-3 may be configured to compute the corresponding total flux induced in those phases of the SR machine 106 into which the test pulse was injected. Moreover, based on preprogrammed relationships between flux, voltage and current, as well as predetermined electrical properties of the SR machine 106, the controller 128 may be configured to compute the total flux value by integrating the total voltage of the test pulse over the duration thereof.

Based at least partially on the total flux value, the controller 128 may determine a self-induced or decoupled flux value in block 132-4 of FIG. 2. More specifically, the controller 128 may be preprogrammed to compute or determine the decoupled flux value based on a difference between the total flux value and a mutual flux value, or the flux due to mutual coupling within the SR machine 106 for each idle phase. The controller 128 may be configured to determine the mutual flux value by direct computation or by reference to predefined models or relationships programmed into the memory 130 associated with the controller 128. In particular, the memory 130 may retrievably store one or more preprogrammed lookup tables, maps, or the like, which correlate different possible operating states of the SR machine 106 with different mutual flux values. For example, the preprogrammed models may output or suggest to the controller 128 the mutual flux value that best corresponds to the measured phase current, the rotor position feedback, and/or any other relevant parameter of the SR machine 106.

Once the mutual flux value is obtained, the controller 128 may be configured to determine the decoupled flux value by direct computation or by reference to predefined models or relationships programmed in memory 130. In one embodiment for instance, the controller 128 may be configured to compute the decoupled flux value by subtracting the mutual flux value from the total flux value. In alternative embodiments, the controller 128 may be configured to lookup the appropriate decoupled flux value from predefined lookup tables, maps, or the like, that are stored in memory 130 and adapted to indicate appropriate decoupled flux values for different combinations of total flux and mutual flux values. Based on the decoupled flux value for given idle phases of the SR machine 106, the controller 128 may further be configured to determine the position of the rotor 110 relative to the stator 112 in block 132-5. More particularly, the controller 128 may directly compute, or alternatively, access one or more predefined models, such as lookup tables, maps, or the like, that are preprogrammed in memory 130 and interpolate different rotor positions for different machine states. For example, the predefined models may be able to indicate the rotor position based on a given phase current, decoupled flux value, or the like.

Once rotor position is obtained, the controller 128 may optionally or additionally be configured to derive the speed and/or direction of the rotor 110 relative to the stator 112, in accordance with optional block 132-6 of the method 132 of FIG. 2. In still further modifications, the controller 128 may be configured to determine or compute other parameters pertaining to the SR machine 106 which may be derived based on the rotor position. Furthermore, in block 132-7 of the method 132 of FIG. 2, the controller 128 may be configured to control the converter circuit 116, or the switches 120 thereof, and operate the phases of the SR machine 106 in accordance with the rotor position information and/or any additional information derived therefrom. Once appropriate controls or adjustments to the SR machine 106 have been made, the controller 128 may continue or return to any of the blocks in the method 132 shown and repeat any one or more of the processes as needed.

Figure 3:
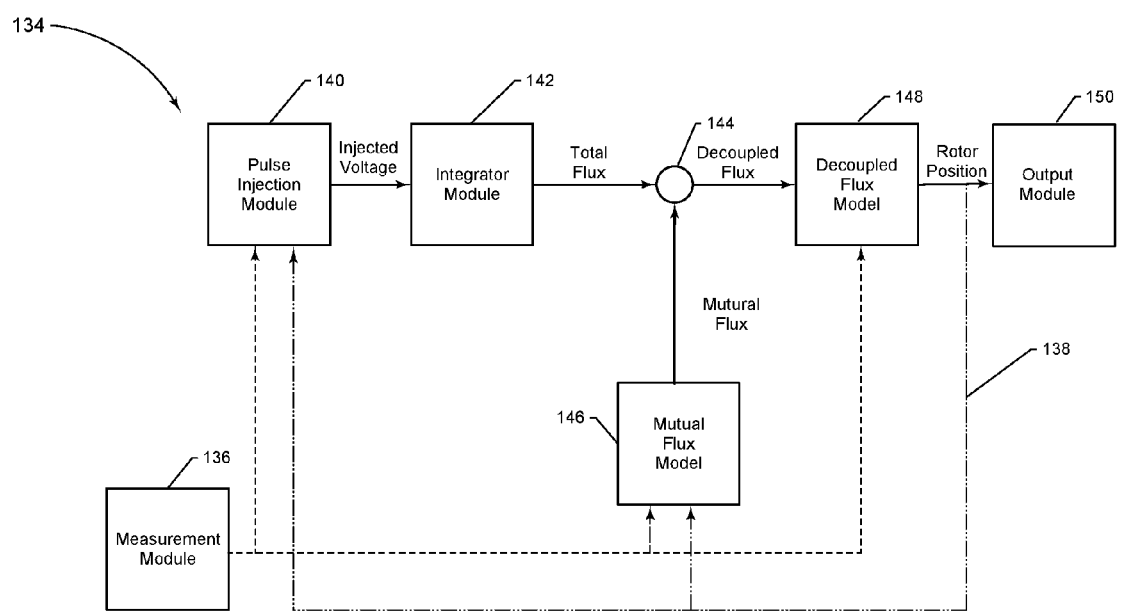
FIG. 3 is a diagrammatic view of one exemplary control scheme for operating an SR machine.

Turning to FIG. 3, one exemplary embodiment of a control scheme 134 for operating an SR machine 106 is shown in diagrammatic form. More particularly, the control scheme 134 may be implemented on the controller 128 and configured to at least determine the position of the rotor 110 relative to the stator 112 of the SR machine 106 in accordance with the method 132 of FIG. 2 for instance. As shown, the control scheme 134 may include a measurement module 136 that is configured to monitor at least the phase current within the SR machine 106, or at least the current through each idle phase, and communicate data corresponding to the measured phase current as needed by any one or more of a plurality of computations being performed by the controller 128. The control scheme 134 may also include a feedback loop 138 which provides data pertaining to the last known or most recently determined rotor position, or rotor position feedback data, to be referenced during any one or more of the computations by the controller 128.

In accordance with block 132-2 of the method 132 of FIG. 2 for instance, the control scheme 134 may further implement a pulse injection module 138 adapted to inject a diagnostic or test pulse of voltage into the relevant phases of the SR machine 106. Specifically, the pulse injection module 138 may be configured to inject a test pulse with a substantially constant current height through at least each idle or non-controlling phase of the stator 112. The test pulse, such as the duration, magnitude and consistency of the injected signal, may be configured at least partially based on the measured phase current provided by the measurement module 136 and the rotor position feedback data provided by the feedback loop 138. The injected test pulse signal may then be communicated to an integrator module 142 which integrates the test pulse voltage to calculate the corresponding total flux value induced in the idle phases of the SR machine 106, for example, in accordance with block 132-3 of the method 132 of FIG. 2.

Once the total flux value has been obtained, the control scheme 134 may be configured to determine the self-induced or decoupled flux value corresponding to the idle phases from the total flux value as in block 132-4 of the method 132 of FIG. 2. More specifically, because the total flux value is the sum of the decoupled flux value and the mutual flux value, or flux due to mutual coupling for a given set of idle phases of the SR machine 106, the control scheme 134 may be able to obtain the decoupled flux value based on a difference between the total flux value and the mutual flux value. For example, the control scheme 134 may employ an adder 144, or the like, to subtract out the mutual flux value from the total flux value and isolate the decoupled flux value. To determine the mutual flux, the control scheme 134 may refer to a mutual flux model 146 which outputs or estimates the mutual flux value based on the operating state of the SR machine 106. For example, the mutual flux model 146 may provide one or more preprogrammed lookup tables, maps, or the like, which correlate different mutual flux values for different possible combinations of phase current and rotor position. Using such predefined models, the control scheme 134 may be able to determine the mutual flux value based on the phase current as measured by the measurement module 136 and the rotor position as provided by the feedback loop 138.

Based on the decoupled flux value determined for a given set of idle phases, the control scheme 134 may employ a decoupled flux model 148 to determine the corresponding rotor position in accordance with block 132-5 of the method 132 of FIG. 2 for example. The decoupled flux model 148 may employ one or more lookup tables, maps, or the like, which are preprogrammed according to known relationships between rotor position, phase current, and decoupled or self-induced flux values best suited for standstill or low speed operations of the SR machine 106. More specifically, based on the computed decoupled flux value and the phase current as measured by the measurement module 136, the decoupled flux model 148 may be able to output a reliable estimate of the current rotor position. In accordance with block 132-6 of the method 132 of FIG. 2, the control scheme 134 may further provide an output module 150 to perform any additional computations on the determined rotor position. For example, the output module 150 may be configured to derive the rotor speed and/or direction to further aid in the control of the converter circuit 116 and/or the SR machine 106. The rotor position data may also be fed back into the control scheme 134 by the feedback loop 138 for further iterations.

INDUSTRIAL APPLICABILITY

In general, the foregoing disclosure finds utility in various applications relating to switched reluctance (SR) machines or any other suitable electric machine being employed as motors and/or generators. In particular, the disclosed systems and methods may be used to provide more efficient control of SR machines that are typically employed in association with the electric drives of power generation machines, industrial work vehicles, and other types of machines commonly used in the art. The present disclosure may also be implemented with other variable-speed drives commonly used in association with industrial and consumer product applications. The present disclosure may further be used with integrated starters, generators, or the like, commonly associated with automotive, aerospace, and other comparable mobile applications.

More specifically, the present disclosure provides a means for operating an SR machine during standstill and low speed operations which does not rely on complex and costly rotor position sensors to provide reliable rotor position feedback. In particular, the systems and methods disclosed herein provide more accurate, cost-effective and sensorless means for determining rotor position to enable more efficient operation of SR machines. The present disclosure thereby also enables implementation of SR machines and associated electric drives in applications where use of rotor position sensors was otherwise not practical.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

The invention claimed is:

1. A method for determining rotor position of a sensorless control of a switched reluctance (SR) machine having a rotor and a stator at standstill or low speed, comprising:
injecting a test pulse into one or more idle phases of the SR machine;
determining a decoupled flux value based at least partially on a total flux value corresponding to the test pulse and a mutual flux value; and
determining the rotor position based at least partially on the decoupled flux value, wherein the test pulse being injected is based at least partially on a measured phase current and rotor position feedback.

2. The method of claim 1, wherein the test pulse is configured to have a substantially constant current height, the test pulse being injected based at least partially on a measured phase current and rotor position feedback.

3. The method of claim 1, wherein the total flux value is determined based at least partially on a voltage integration of the test pulse.

4. The method of claim 1, wherein the mutual flux value is determined based on one or more predefined relationships between mutual flux values, measured phase current values, and rotor position feedback values.

5. The method of claim 1, wherein the decoupled flux value is determined based at least partially on a difference between the total flux value and the mutual flux value.

6. The method of claim 1, wherein the rotor position is determined based on one or more predefined relationships between decoupled flux values, measured phase current values, and rotor position values.

7. A sensorless control system for a switched reluctance (SR) machine having a rotor and a stator at standstill or low speed, comprising:
a converter circuit in electrical communication between the stator and a common bus; and
a controller in electrical communication with at least the converter circuit, the controller being configured to inject a test pulse into one or more idle phases of the SR machine, determine a decoupled flux value based at least partially on a total flux value corresponding to the test pulse and a mutual flux value, and determine the rotor position based at least partially on the decoupled flux value,
wherein the test pulse being injected is based at least partially on a measured phase current and rotor position feedback.

8. The control system of claim 7, wherein the controller is configured to inject the test pulse to have a substantially constant current height.

9. The control system of claim 7, wherein the controller is configured to determine the mutual flux value by referring to one or more preprogrammed maps defining relationships between mutual flux values, measured phase current values, and rotor position feedback values.

10. The control system of claim 7, wherein the controller is configured to determine the decoupled flux value by computing a difference between the total flux value and the mutual flux value, and determine the rotor position by referring to one or more preprogrammed maps defining relationships between decoupled flux values, measured phase current values, and rotor position values.

* * * * *